(12) United States Patent
Hix et al.

(10) Patent No.: US 9,031,914 B2
(45) Date of Patent: May 12, 2015

(54) TIER-BASED DATA MANAGEMENT

(75) Inventors: Gary R. Hix, Warrenton, VA (US); Philip T. Spencley, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 12/428,091

(22) Filed: Apr. 22, 2009

(65) Prior Publication Data

US 2010/0274827 A1 Oct. 28, 2010

(51) Int. Cl.
*G06F 17/30* (2006.01)
*G06F 7/00* (2006.01)

(52) U.S. Cl.
CPC .... *G06F 17/30289* (2013.01); *G06F 17/30085* (2013.01)

(58) Field of Classification Search
CPC .............. G06F 17/30067; G06F 3/067; G06F 11/1451; G06F 11/1458; G06F 11/1469
USPC ................................................. 707/654, 665
See application file for complete search history.

(56) References Cited

U.S. PATENT DOCUMENTS

| | | | |
|---|---|---|---|
| 5,917,958 A * | 6/1999 | Nunally et al. | 382/276 |
| 6,560,616 B1 * | 5/2003 | Garber | 1/1 |
| 7,092,977 B2 * | 8/2006 | Leung et al. | 1/1 |
| 7,225,211 B1 * | 5/2007 | Colgrove et al. | 707/693 |
| 2006/0041719 A1 | 2/2006 | Chui et al. | |
| 2007/0198612 A1 | 8/2007 | Prahlad et al. | |
| 2008/0005194 A1 * | 1/2008 | Smolen et al. | 707/202 |
| 2009/0077136 A1 | 3/2009 | Igawa et al. | |

OTHER PUBLICATIONS

HPILM: "Information Lifecycle Management technique overview", 5982-3398EN, Jan. 2004.*
LEGATO Information Lifecycle Management Solutions on the Microsoft Windows Server™, Microsoft, 2003.*
Information lifecycle management maturity model White Paper Apr. 2005, Sun Microsystems, Inc.*
Information Lifecycle Management for Business Data An Oracle White Paper Jun. 2007 Oracle Corporation.*
St Pierre, E., "ILM: Tiered Services & The Need For Classification," an Information Lifecycle Management Tutorial, Storage Networking Industry Association (SNIA) Education Committee, SNW San Diego, Apr. 2007.

(Continued)

*Primary Examiner* — Kuen Lu
(74) *Attorney, Agent, or Firm* — William E. Schiesser; Hunter E. Webb; Keohane & D'Alessandro PLLC

(57) ABSTRACT

The present invention addresses the deficiencies of the related art by providing a tier-based data storage solution. Specifically, the present invention evaluates the data contained in database tables by analyzing several metrics for the data, and creating a valuation score. The valuation score is used to determine the storage tier that would meet the performance and availability requirements of the database with the goal of reducing the costs associated with storing that data. The metrics that are used to evaluate database tables include (among others): table purpose, data retention, disk requirements, data criticality, data relevance, and desired performance. As such, the present invention will develop a data (lifecycle) storage plan for each set of data. This storage plan not only identifies an initial storage tier where the data should be stored, but also identifies, if, when and to where the data should be moved thereafter.

24 Claims, 3 Drawing Sheets

(56) References Cited

OTHER PUBLICATIONS

Dorion, P., "Why You Should Perform Data Classification," SearchStorage.com, Jul. 13, 2007.

Bigelow, S., "Data storage management overview: Chapter 3—Tiered Storage," SearchStorage.com, Jul. 24, 2006.

Damaoulakis, J., "Opinion: The elusiveness of data classification," Computer/World.com, Sep. 9, 2008.

* cited by examiner

US 9,031,914 B2

TIER-BASED DATA MANAGEMENT

FIELD OF THE INVENTION

The present invention generally relates to information/data management. Specifically, the present invention relates to an approach for developing a tier-based, data lifecycle storage plan.

BACKGROUND OF THE INVENTION

As greater demands for data storage and access continue to occur, data storage management is becoming a more crucial issue. Currently, many alternatives exist for storing data. Such approaches can involve several tiers of storage devices or the like. Unfortunately, no existing solution provides a way to select exactly, where, when and/or how the data should be stored. Moreover, no existing approach provides a comprehensive storage plan for the data over its entire lifecycle.

SUMMARY OF THE INVENTION

The present invention addresses the deficiencies of the related art by providing a tier-based data storage solution. Specifically, the present invention evaluates the data contained in database tables by analyzing several metrics for the data, and creating a valuation score. The valuation score is used to determine the storage tier (storage tier is an electronic storage device) that would meet the performance and availability requirements of the database with the goal of reducing the costs associated with storing that data. The metrics that are used to evaluate database tables include (among others): table purpose, data retention, disk requirements, data criticality, data relevance, and desired performance. As such, the present invention will develop a data (lifecycle) storage plan for each set of data. This storage plan not only identifies an initial storage tier where the data should be stored, but also identifies, if, when and to where the data should be moved thereafter.

A first aspect of the present invention provides a method for data management, comprising: analyzing a set of metrics for a set of data in a computer database, the set of metrics comprising at least one of the following: table purpose, data retention, computer disk drive requirements, data criticality, data relevance, and desired performance; developing a lifecycle storage plan for the set of data based on the analyzing; and storing the set of data in a first storage tier, the first storage tier comprising an electronic storage device, and the first storage tier being selected based on the storage plan.

A second aspect of the present invention provides a system for data management, comprising: a module for analyzing a set of metrics for a set of data in a computer database, the set of metrics comprising at least one of the following: table purpose, data retention, computer disk drive requirements, data criticality, data relevance, and desired performance; a module for developing a lifecycle storage plan for the set of data based on the analyzing; and a module for storing the set of data in a first storage tier, the first storage tier comprising an electronic storage device, and the first storage tier being selected based on the storage plan.

A third aspect of the present invention provides a computer readable medium containing a program product for data management, the computer readable medium comprising program code for causing a computer system to: analyze a set of metrics for a set of data in a computer database, the set of metrics comprising at least one of the following: table purpose, data retention, computer disk drive requirements, data criticality, data relevance, and desired performance; develop a lifecycle storage plan for the set of data based on the analyzing; and store the set of data in a first storage tier, the first storage tier comprising an electronic storage device, and the first storage tier being selected based on the storage plan.

A fourth aspect of the present invention provides a method for deploying a system for data management, comprising: providing a computer infrastructure being operable to: analyze a set of metrics for a set of data in a computer database, the set of metrics comprising at least one of the following: table purpose, data retention, computer disk drive requirements, data criticality, data relevance, and desired performance; develop a lifecycle storage plan for the set of data based on the analyzing; and store the set of data in a first storage tier, the first storage tier comprising an electronic storage device, and the first storage tier being selected based on the storage plan.

A fifth aspect of the present invention provides a processing system for data management, comprising; a memory medium containing instructions, a bus coupled to the memory medium, and a processor coupled to the bus that when executing the instructions causes the processing system to: analyze a set of metrics for a set of data in a computer database, the set of metrics comprising at least one of the following: table purpose, data retention, computer disk drive requirements, data criticality, data relevance, and desired performance; develop a lifecycle storage plan for the set of data based on the analyzing; and store the set of data in a first storage tier, the first storage tier comprising an electronic storage device, and the first storage tier being selected based on the storage plan.

BRIEF DESCRIPTION OF THE DRAWINGS

These and other features of this invention will be more readily understood from the following detailed description of the various aspects of the invention taken in conjunction with the accompanying drawings in which.

Figure 1:
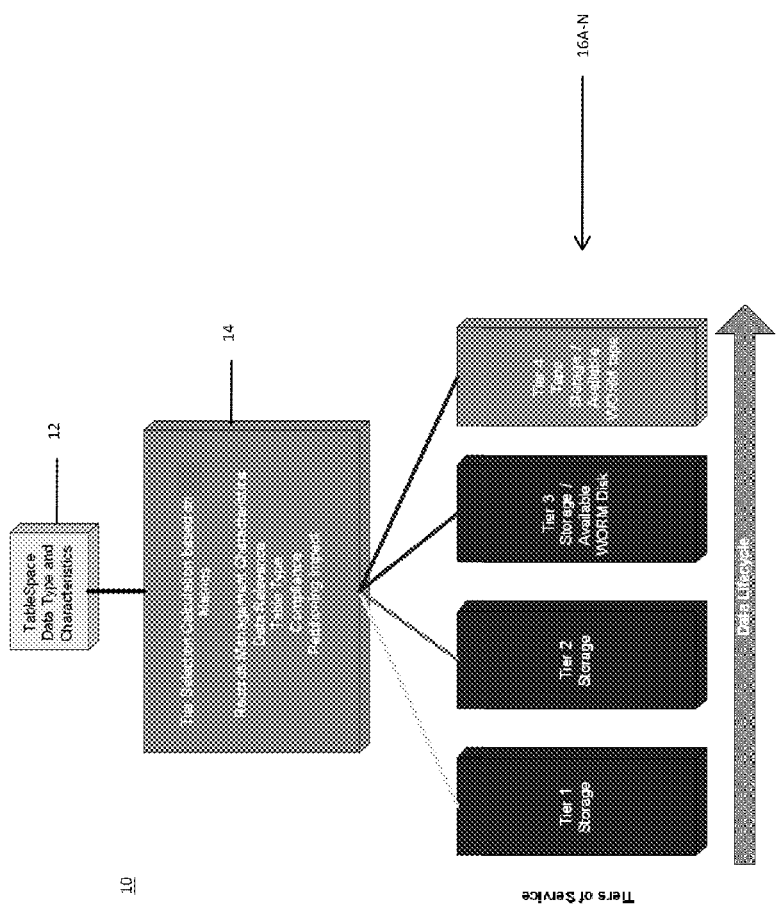
FIG. 1 shows a tier-based data storage system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:

I. General Description
II. Computerized Implementation

I. General Description

The present invention addresses the deficiencies of the related art by providing a tier-based data storage solution. Specifically, the present invention evaluates the data contained in database tables by analyzing several metrics for the data, and creating a valuation score. The valuation score is used to determine the storage tier that would meet the performance and availability requirements of the database with the goal of reducing the costs associated with storing that data. The metrics that are used to evaluate database tables include (among others): table purpose, data retention, disk requirements, data criticality, data relevance, and desired performance. As such, the present invention will develop a data (lifecycle) storage plan for each set of data. This storage plan not only identifies an initial storage tier where the data should be stored, but also identifies, if, when and to where the data should be moved thereafter. As used herein, the term storage tier means an electronic storage device Referring to FIG. 1, a data storage management system 10 according to the present invention is shown. Under the present invention, sets of data (along with the type of data and various characteristics) 12 from a database table(s) are received by data management lifecycle calculator 14. Using a set of metrics, data management lifecycle calculator 14 will develop a data storage plan for set of data 12. The data plan will cover the entire lifecycle of set of data 12. Specifically, the data storage plan will dictate what storage tier 16A-N (e.g., electronic set of data 12 should initially be stored in as well as if, when and to what other data storage tier set of data 12 should later be moved.

In general, the data storage plan is based on a scoring value system that is determined from the analysis of several metrics related to the data. Such metrics are set forth and defines in the table below:

| | |
|---|---|
| Table Purpose | Each table in a database has a specific function and may not require expensive high speed, highly available disk. For example, tables that contain information that is infrequently accessed but is needed for audit purposes could be placed on a lower tier of storage that can reduce the costs associated with the long term retention of that data. Tables that have a high rate of access and a high performance requirement can be placed on higher speed storage to ensure response time requirements are met. |
| Data Retention | The Records Management policies defined by customers are used to determine how long data should remain within a particular database before being purged or disposed of by other means. For example, data older than the maximum retention period of 7 years could be archived and purged from the database reducing the amount of disk storage used by the database and reducing the costs associated with data storage. |
| WORM Disk Drive requirements: | The WORM Disk requirement metric identifies database tables that require a non-erasable, non-rewritable format. This information is provided for planning purposes only. |
| Data Criticality | This metric is used to gauge the impact to the business should there be an outage of this database or the application(s) that access this database. Data with a high criticality should be placed on a higher tier of storage with an appropriate level of Disaster Recovery capabilities to ensure that application meets its availability requirements. |
| Data Relevance | This metric can also be referred to as the access pattern of the data. This metric is used to determine the frequency of data access during the lifecycle of the data. As data ages it may still be required for audit purposes but the longer a piece of data is in the system the less it is accessed. Determining the frequency of data access will allow for the creation of thresholds by which data can be moved to other tiers to optimize the use of Tier 1 storage. |
| Desired Performance | To ensure the optimum performance of an application, such as a large database, an appropriate tier of storage must be used. For example a transaction database for a customer facing application would have a higher performance requirement than a database that stores reference information. The user's performance expectations should be documented in a Service Level Agreement to allow appropriate for architectural planning. |

It should be understood that this is intended to be a non-exhaustive list of metrics, and that other could be applied. In any event, the scoring system will clearly identify the best storage tiers for storing set of data 12 and later moving the data. Typically the storage tier having the highest corporate or average score(s) for the metrics will be assigned set of data 12. To this extent, the scoring could be a ranking system in which each storage tier is ranged 1-N for each metric, with the storage tier having the highest average score being the candidate for initially storing set of data 12.

Figure 2:
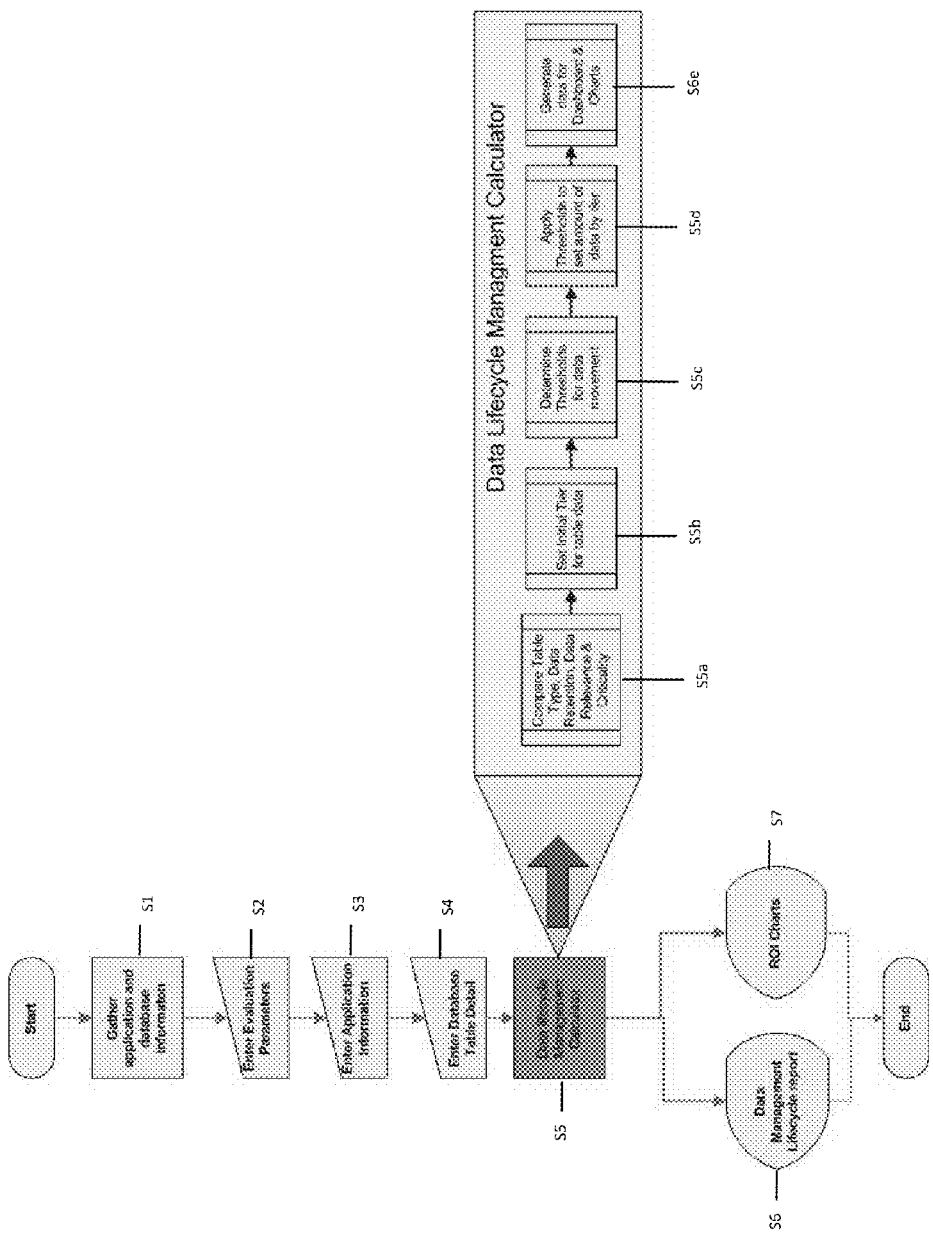
FIG. 2 shows a method flow diagram according to the present invention.

This process is further described in the method flow diagram of FIG. 2. In step S1, application and database information is gathered. In step S2, evaluation parameters are entered. In step S3, application information in entered. In step S4, data management lifecycle calculator 14 will perform its analysis in a series of sub-steps. Specifically, in step S5a, it will compare the metrics set forth above. In step S5b, it will set an initial tier for the set of data. In step S5c it will determine threshold for data set movement. In set S5d it will apply those thresholds to the given set of data. In step S5e, it will generate data for dashboards and charts. Thereafter, the data will be populated into data lifecycle manage report(s) and return on investment (ROI) charts in steps S6 and S7.

II. Comuterized Implementation

Figure 3:
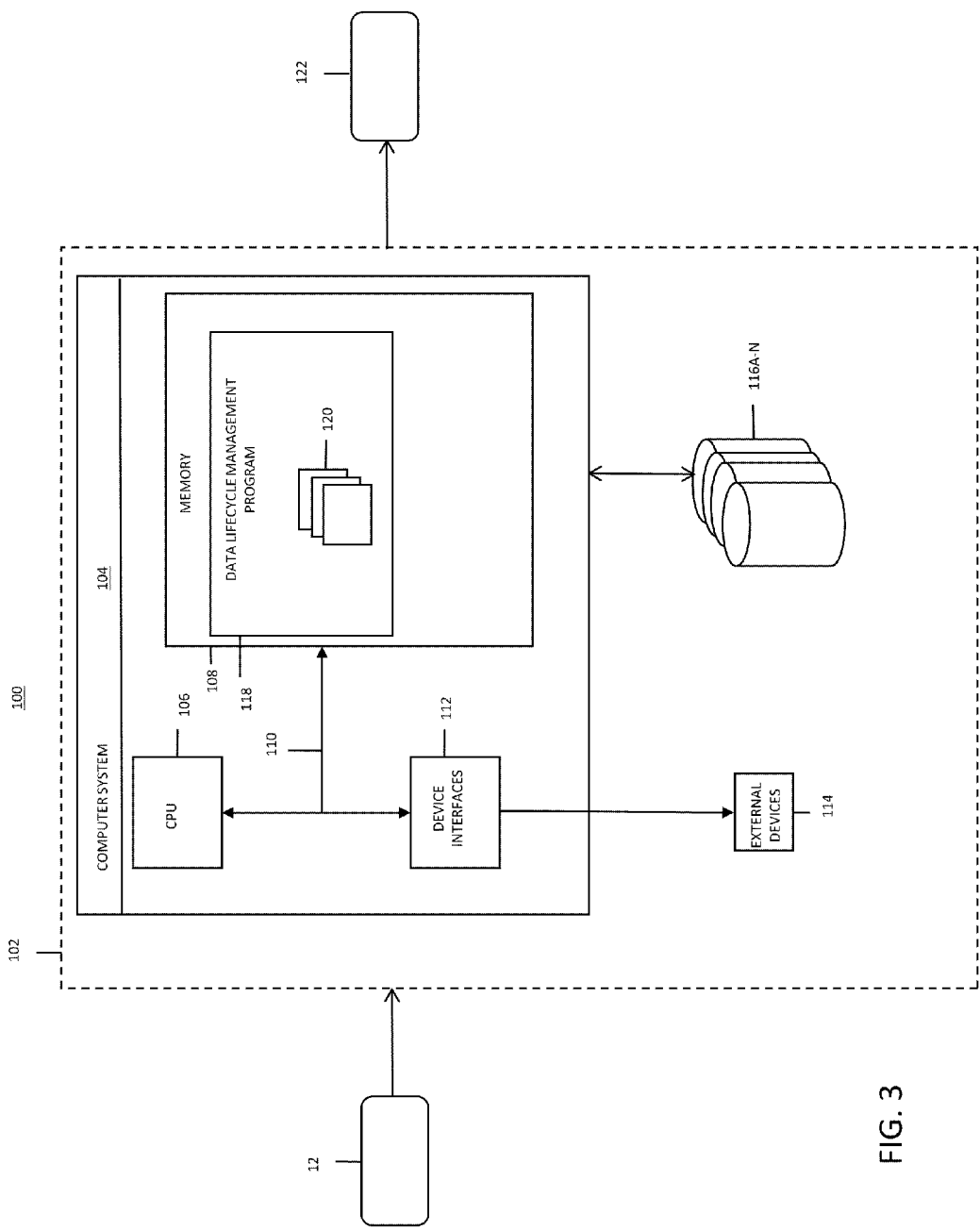
FIG. 3 depicts a more specific computerized implementation according to the present invention.

Referring now to FIG. 3, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

Computer system is intended to represent any type of computer system that may be implemented in deploying/realizing the teachings recited herein. As shown, computer system 104 includes a processing unit 106, a memory 108, a bus 110, and device interfaces 112. Further, computer system 104 is shown communicating with one or more external devices 114 that communicate with bus via device interfaces. In general, processing unit 106 executes computer program code, such data lifecycle management program 118, which is stored in memory 108 and/or storage tiers 116A-N. While executing computer program code, processing unit 106 can read and/or write data to/from memory 108, storage tiers 116A-N, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices. Although not shown, computer system 104 could contain multiple processing units.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, processing unit 106 may comprise a single processing unit, or be distributed across one or more processing units in one or more locations, e.g., on a client and server. Similarly, memory 108 and/or storage tiers 116A-N can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in computer system 104.

Storage tiers 116A-N can be any type of capable of providing storage for information under the present invention. To this extent, storage tiers 116A-N could include one or more storage devices such as magnetic disk drive or an optical disk drive. In another embodiment, storage tiers 116A-N includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is data lifecycle management program 118, which has a set of modules 120. Set of modules 120 generally provide the functions of the present invention as described herein. For example, (among other things), set of modules 120 is configured to: receive input such as set of data 12; analyze a set of metrics for a set of data, the set of metric comprising at least one of the following: table purpose, data retention, disk requirements, data criticality, data relevance, and desired performance; develop a lifecycle storage plan for the set of data based on the analyzing; store the set of data in a first storage tier, the first storage tier being selected based on the storage plan; determine a valuation score based on the analysis, the valuation score being used to identify the first storage tier; move the set of data from the first storage tier to a second storage tier after a predetermined amount of time, the second storage tier and the predetermined amount of time being based on the storage plan; and/or generate output 122.

While shown and described herein as a framework for data management, it is understood that the invention further provides various alternative embodiments. For example, in one embodiment, the invention provides a computer-readable/useable medium that includes computer program code to enable a computer infrastructure to manage data. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage tiers 116A-N (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide data management. In this case, the service provider can create, maintain, support, etc., a computer infrastructure, such as computer infrastructure 102 (FIG. 3) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for data management. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for data management, comprising:
   analyzing a set of metrics for each of a first set of data and a second set of data in a computer database, the set of metrics comprising the following: table purpose, data retention, computer disk drive requirements, data criticality, data relevance, and desired performance;
   developing a lifecycle storage plan for the first set of data that is specific to the first set of data, said developing comprising determining a first valuation score based on said analyzing of all of the set of metrics corresponding to the first set of data;
   developing a second lifecycle storage plan for the second set of data that is specific to the second set of data, said developing comprising determining a second valuation score based on said analyzing of all of the set of metrics corresponding to the second set of data; and
   storing the first set of data in a first storage tier, the first storage tier comprising an electronic storage device, and the first storage tier being selected based on said lifecycle storage plan.

2. The method of claim 1, said first valuation score being used to identify the first storage tier.

3. The method of claim 1 further comprising moving the first set of data from the first storage tier to a second storage tier corresponding to a lower valuation score after a predetermined amount of time, the second storage tier and the predetermined amount of time being based on the storage plan.

4. The method of claim 1, the table purpose identifying speed requirements and disk availability requirements of the first set of data.

5. The method of claim 1, the data retention identifying a length of time of storage of the first set of data.

6. The method of claim 1, the disk requirements identifying an erasability requirement and a writeability requirement of the first set of data stored on a disk.

7. The method of claim 1, the data criticality identifying a business importance of the first set of data.

8. The method of claim 1, the data relevance identifying an access pattern to the first set of data.

9. The method of claim 1, the desired performance identifying technical needs of an application using the first set of data.

10. A computer system for data management, comprising:
    at least one processing unit;
    memory operably associated with the at least one processing unit; and
    a module for analyzing a set of metrics for a first set of data and a second set of data in a computer database, the set of metrics comprising the following: table purpose, data retention, computer disk drive requirements, data criticality, data relevance, and desired performance;
    a module for developing a lifecycle storage plan for the first set of data that is specific to the first set of data and for developing a second lifecycle storage plan for the second set of data that is specific to the second set of data, said developing comprising determining a first valuation score based on said analyzing of all of the set of metrics corresponding to the first set of data and determining a second valuation score based on said analyzing of all of the set of metrics corresponding to the second set of data; and
    a module for storing the first set of data in a first storage tier, the first storage tier comprising an electronic storage device, and the first storage tier being selected based on said lifecycle storage plan.

11. The computer system of claim 10, further comprising a module for using said first valuation score to identify the first storage tier.

12. The computer system of claim 10, further comprising a module for moving the first set of data from the first storage tier to a second storage tier corresponding to a lower valuation score after a predetermined amount of time, the second storage tier and the predetermined amount of time being based on the storage plan.

13. The computer system of claim 10, the table purpose identifying speed requirements and disk availability requirements of the first set of data.

14. The computer system of claim 10, the data retention identifying a length of time of storage of the first set of data.

15. The computer system of claim 10, the disk requirements identifying an erasability requirement and a writeability requirement of the first set of data stored on a disk.

16. The computer system of claim 10, the data criticality identifying a business importance of the first set of data.

17. The computer system of claim 10, the data relevance identifying an access pattern to the first set of data.

18. The computer system of claim 10, the desired performance identifying technical needs of an application using the first set of data.

19. A computer readable storage device containing a program product for data management, the computer readable storage device comprising program code for causing a computer system to:
    analyze a set of metrics for a first set of data and a second set of data in a computer database, the set of metrics comprising the following: table purpose, data retention, computer disk drive requirements, data criticality, data relevance, and desired performance;
    develop a lifecycle storage plan for the first set of data that is specific to the set of data, said developing comprising determining a first valuation score based on said analyzing of all of the set of metrics corresponding to the first set of data;
    develop a second lifecycle storage plan for the second set of data that is specific to the second set of data, said developing comprising determining a second valuation score based on said analyzing of all of the set of metrics corresponding to the second set of data; and
    store the first set of data in a first storage tier, the first storage tier comprising an electronic storage device, and the first storage tier being selected based on said lifecycle storage plan.

20. The computer readable storage device containing the program product of claim 19, the computer readable medium further comprising program code for causing the computer system to:
    use said first valuation score to identify the first storage tier.

21. The computer readable storage device containing the program product of claim 19, the computer readable medium further comprising program code for causing the computer system to:

move the first set of data from the first storage tier to a second storage tier corresponding to a lower valuation score after a predetermined amount of time, the second storage tier and the predetermined amount of time being based on the storage plan.

22. A method for deploying a system for data management, comprising;

providing a computer infrastructure being operable to:

analyze a set of metrics for a first set of data and a second set of data in a computer database, the set of metrics comprising the following: table purpose, data retention, computer disk drive requirements, data criticality, data relevance, and desired performance;

develop a lifecycle storage plan for the first set of data that is specific to the first set of data, said developing comprising determining a first valuation score based on said analyzing of all of the set of metrics corresponding to the first set of data;

develop a second lifecycle storage plan for the second set of data that is specific to the second set of data, said developing comprising determining a second valuation score based on said analyzing of all of the set of metrics corresponding to the second set of data; and store the first set of data in a first storage tier, the first storage tier comprising an electronic storage device, and the first storage tier being selected based on said lifecycle storage plan.

23. The method of claim 22, the computer infrastructure being further operable to: use the first valuation score to identify the first storage tier.

24. The method of claim 22, the computer infrastructure being further operable to: move the first set of data from the first storage tier to a second storage tier corresponding to a lower valuation score after a predetermined amount of time, the second storage tier and the predetermined amount of time being based on the storage plan.

* * * * *